June 13, 1967  M. S. HANKE  3,324,735
FABRICATED PULLEY

Filed July 31, 1964  2 Sheets-Sheet 1

INVENTOR.
MERLIN S. HANKE
BY *Watts & Fisher*
ATTORNEYS

June 13, 1967  M. S. HANKE  3,324,735
FABRICATED PULLEY

Filed July 31, 1964  2 Sheets-Sheet 2

INVENTOR.
MERLIN S. HANKE
BY
Watts & Fisher
ATTORNEYS

United States Patent Office 3,324,735
Patented June 13, 1967

3,324,735
FABRICATED PULLEY
Merlin S. Hanke, 501 Vineland Road,
Bay Village, Ohio 44140
Filed July 31, 1964, Ser. No. 386,686
4 Claims. (Cl. 74—230.4)

This invention relates generally to pulleys, and more specifically to new and useful improvements in the manufacture of fabricated sheet metal pulley constructions.

In the manufacture of fabricated pulleys suitable for use in belt transmissions or the like, it has been conventional to employ a machined hub. The usual construction has generally consisted of stamped disks having center openings and rim portions which cooperate to define the belt-receiving groove. The machined hub has been mounted through the openings and suitably secured to the disks, as by welding, staking, spinning or brazing.

One objection to this conventional construction has been the high cost of the hubs. The hubs must be accurately machined to provide a good fit on the shaft. Otherwise, the pulley may wobble and cause misalignment of the belt and excessive belt wear. The proper securing of the split pulley disks to the hub also has presented certain manufacturing problems. One such problem has been to secure the disks so that they would not slip on the hub. Another problem has been to maintain exact alignment of the disks during assembly with the hub so that the pulley will run true in use.

With the conventional construction, it has also been necessary for a manufacturer to machine and stock many different sizes of hubs to fit on shafts of different diameters. The manufacture of a large number of hubs to accommodate various shaft diameters and the asembly of the different size hubs with the fabricated pulley disks has further contributed to the production costs.

The present invention provides a new and improved fabricated pulley construction which overcomes the foregoing problems and obtains other important advantages. In general, the pulley of this invention is characterized by a strong and yet light weight construction which does not employ a machined hub. Thus, the new construction eliminates the manufacturing costs and assembly problems heretofore associated with the use of machined hubs. It also makes it possible to simplify tooling and production techniques, since the pulley can be readily formed to fit shafts of different diameters.

More particularly, the invention in its preferred embodiment contemplates a construction comprising a pair of stamped sheet metal disks which have rim portions secured together to form a belt-receiving groove. The central portions of the disks are held apart by a spacer member and are integrally formed with the rim portions. The central portions are provided with aligned openings sized to receive the shaft on which the pulley is mounted and are formed with continuous axially projecting flanges around the openings. The flanges serve as bearings for the pulley on a shaft received through the openings.

As will be apparent from the foregoing, the new pulley consists essentially of only three elements, namely, the stamped disks and the spacer member between the central portions of the disks. The disks are inexpensively stamped from sheet metal and are formed to include the center openings and surrounding flanges which serve as bearings for the pulley. The disks can be readily formed to fit different shaft diameters merely by changing the size of the center openings. This size change can be accomplished through the simple expedient of inserts in the disk forming and piercing dies. Further, the disks and spacer can be easily assembled by standardized assembly techniques to form a strong and long-lived structure.

The invention also contemplates a new and improved multiple groove pulley construction. This new multiple groove pulley is easily and inexpensively constructed using the same elements described above and has all of the attendant advantages.

Other advantages and a fuller understanding of the invention will become apparent from the following detailed description and the accompanying drawings.

Figure 1:
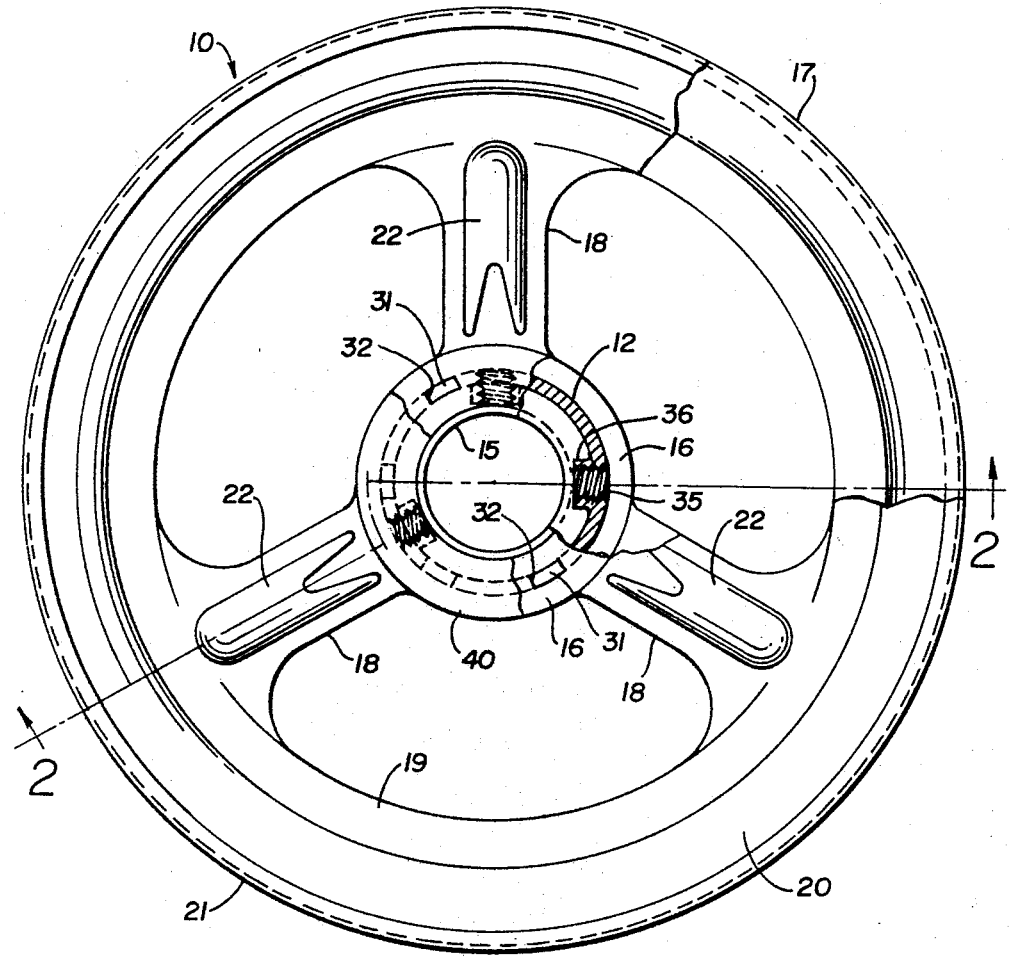
FIGURE 1 is a side elevational view with portions broken away of a preferred embodiment of the invention.
Figure 2:
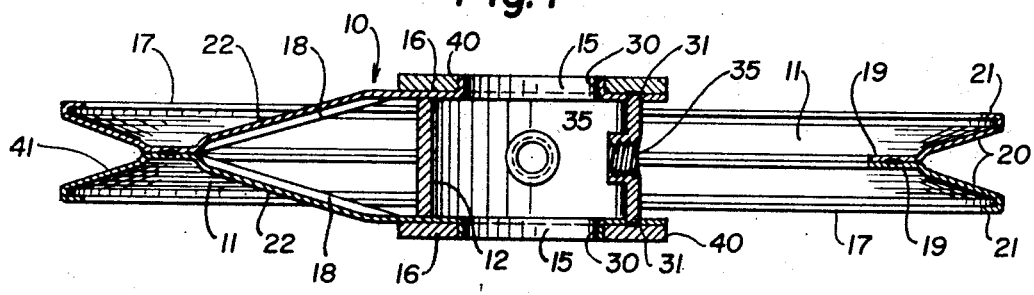
FIGURE 2 is a cross-sectional view taken on the line 2—2 of FIG. 1.

Referring now to the drawings, and to FIGS. 1 and 2 in particular, a new and improved pulley made in accordance with the present invention is indicated generally by reference numeral 10. The illustrated pulley 10 comprises a pair of similarly shaped disks 11 which are secured together near their outer peripheries. The center portions of the disks 11 are spaced apart and are connected to the ends of a tubular spacer member 12.

Each of the disks 11 is inexpensively stamped from a sheet of metal of suitable thickness and is provided with a center opening 15. Each disk 11 further comprises a flat central portion 16 around the opening 15, a rim 17, and a plurality of radial spokes 18 integrally connected between the central portion and the rim. The rims 17 are formed to include a flat annular portion 19 which is offset from the plane of the central portion 15, a bent peripheral portion 20 which flares outwardly from the portion 19, and a reversely bent, circumferential flange 21. Preferably, each of the spoke formations 18 includes an outwardly dished, convex area 22 extending the length of the spoke to increase its strength.

In accordance with this invention, the center openings 15 of the disks 11 are sized to receive the shaft (not shown) on which the pulley 10 is to be mounted, and the central portions 16 are formed to provide integral bearings for the pulley on the shaft. To this end, each central portion 16 is formed with a continuous, axially outwardly extending flange 30 around the opening 15. These cooperating, spaced flanges 30 of the disks 11 are engageable on the shaft and thus serve as bearings for the pulley. The distance between the flanges 30 is such as to prevent the pulley from cocking or tilting on the shaft.

Figure 3:
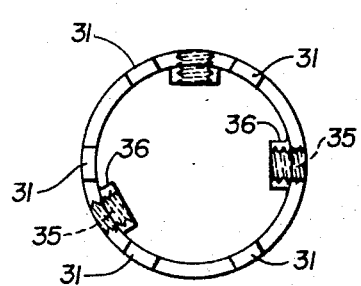
FIGURE 3 is an end elevational view of the preferred spacer member used in the embodiment of FIGS. 1 and 2.
Figure 4:
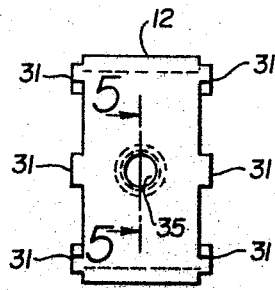
FIGURE 4 is a side elevational view of the spacer member shown in FIG. 3.
Figure 5:
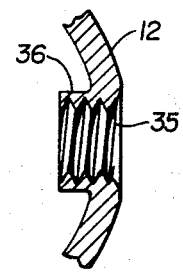
FIGURE 5 is a fragmentary view taken on the line 5—5 of FIG. 4.

The tubular member 12 has a larger diameter than the center openings 15 of the disks and serves to secure the central portions in spaced apart relation. The member 12 is preferably rolled from a flat metal sheet and the abutting, longitudinal edges may be suitably secured, as by welding; however, it is also possible to cut the spacer member from tubular stock. As shown most clearly in FIGS. 3 and 4, the ends of the tubular member 12 are formed to include circumferentially spaced, axially outwardly projecting lugs 31. These lugs 31 are receivable in cooperating slots 32 (FIGS. 1 and 2) formed in the central portions 16 of the disks. One or more tapped holes 35 are formed in the side wall of the member 12 to accommodate set screws (not shown) for securing the pulley 10 to a shaft. Referring particularly to FIG. 5, internally threaded collars 36 are secured to the inside of the member 12 in alignment with the holes 35 in order to provide support for the set screws. Alternately, the collars 36 may be external of the member 12, or material of the spacer may be extruded to replace the collars 36.

The pulley 10 is assembled by placing the disks 11 so that the flat annular rim portions 19 are in engagement and welding the engaged rim portions together. The tubular spacer 12 is mounted between the center portions 16 of the disks with the lugs 31 inserted through the slots 32. In the preferred construction, a ring 40 is fitted around the flange 30 of each disk against the outside surface of the central portion 16. As shown, the rings 40 are welded to the ends of projecting lugs 31 so as permanently to secure the tubular member 12 between the disks.

Thus assembled, the bent peripheral rim portions 20 of the disks 11 flare away from each other to define a belt-receiving groove 41. The spoke formations 18 also flare outwardly of the pulley from the welded rim portions 19 to the axially spaced central portions 16. The tubular member 12 secures the central portions in spaced apart relation so that the inner, axially extending flanges 30 cooperate to form bearings for the pulley, whereby the pulley can be mounted on a shaft extending through the center disk openings 15.

It will be apparent from the foregoing that the fabricated pulley 10 is characterized by a relatively inexpensive, light weight construction which can be assembled with facilities. The wheel disks 11 making up the major portion of the pulley are simply stamped from sheet metal into the described shape and then joined together. Thus, the invention avoids the expensive, relatively heavy machining operations to form hubs from bar stock which characterized many of the prior art pulleys. Similarly, the member 12, which functions primarily as a spacer between the center portions of the disks, is easily and inexpensively formed and then connected to the disks to complete the pulley.

As generally described above, another important feature of the invention resides in the elimination of a separately machined hub as has been used in most conventional constructions. Instead, the central portions of the stamped disks are simply flanged around the center openings to provide bearings for the pulley on a shaft. This construction materially reduces the cost of manufacture as compared to pulleys embodying machined hubs and simplifies stamping operations by eliminating tolerances necessary to provide clearance for machined hubs. The pulley constructed in accordance with this invention can be made to fit shafts of different diameters by merely changing the size of the disk openings 15 without altering any of the other structure. In this manner, tooling costs are reduced and the need for multiple size hubs which must be fitted to the pulley is eliminated.

Figure 6:
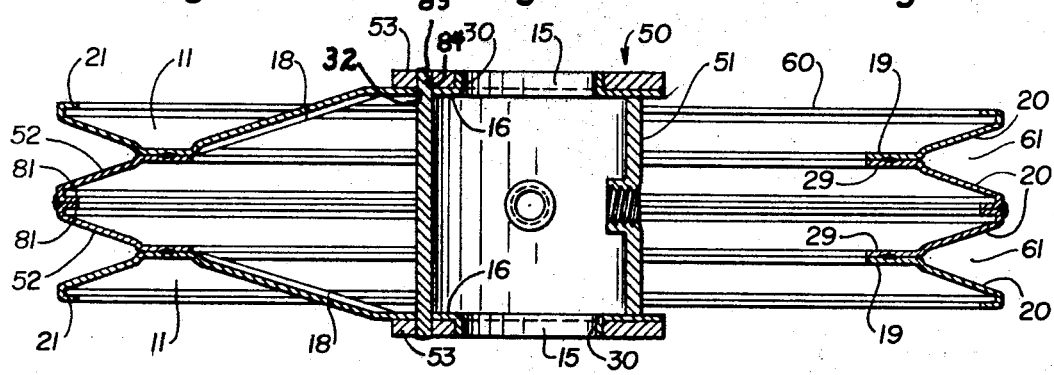
FIGURE 6 is a cross-sectional view taken on the line 6—6 of FIG. 7 and shows a double groove construction which comprises another aspect of this invention.
Figure 7:
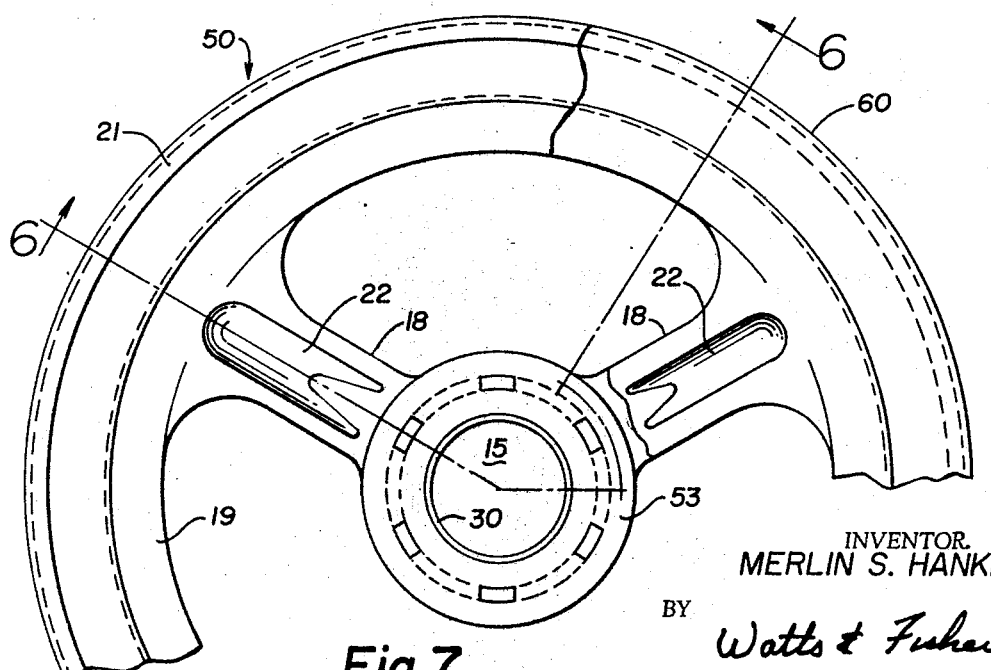
FIGURE 7 is a partial side elevational view of the construction shown in FIG. 6.

Reference is now made to FIGS. 6 and 7 which illustrate a double groove pulley 50 made according to the invention. As shown, the pulley 50 comprises two of the stamped disks 11, a pair of similar spokeless disks 52, and a single tubular spacer member 51 which corresponds to the previously described spacer 12. In fabricating the pulley 50, the flat annular rim portion 19 of each one of the disks is welded to a flat annular rim portion 29 of a spokeless rim 52 similar to the embodiment of FIGS. 1 and 2 to form two single groove assemblies. In the spokeless disks 52, the spoke formations and center portion of the disk are eliminated. The two single groove assemblies are then connected together by placing the circumferential flanges 81 of the disks 52 in engagement and welding, staking or otherwise securing the abutting disks 52 together at spaced locations around the periphery of the pulley. The tubular member 51 is secured between the center portions 16 of the disks 11 by means of the rings 53 in the same manner as described in conjunction with FIGS. 1 and 2.

In FIGURE 6 lugs 83 on the member 51 extend through both the slots 32 in the disks 11 and similar slots 84 in the rings 53. This construction is preferable in some applications and may be employed is the embodiment of FIGS. 1 and 2.

Thus assembled, the pulley 50 compresses a rim 60 which includes two belt-receiving grooves 61 defined by the oppositely flaring rim portions 20. The rim 60 is offset between the planes of the spaced apart central portions 16 and is connected thereto by the integrally formed, inclined spokes 18. As in the embodiment of FIGS. 1 and 2, the central portions 16 are flanged at 30 around the center disk openings 15 so as to form spaced bearings for the pulley on a shaft.

Many modifications and variations of the invention will be apparent to those skilled in the art in view of the foregoing detailed description. Therefore, it is to be understood that, within the scope of the appended claims, the invention can be practiced otherwise than as specifically shown and described.

What is claimed is:
1. A fabricated pulley comprising:
 (a) two pairs of sheet metal disks,
 (b) each of said pairs including a first disk and a second disk,
 (c) said first disks including rims having bent peripheral portions, central portions, and integrally formed spokes extending between said bent peripheral portions and said central portions, said spokes being inclined inwardly of said pulley from said central portions,
 (d) said central portions including aligned center openings sized to receive a shaft on which said pulley is mounted, and each central portion including a continuous, axially projecting flange around its center opening, said flanges cooperating to form bearings for said pulley on a shaft received through said openings,
 (e) said second disks having continuous rims welded together and each including a bent peripheral portion co-operating with a corresponding one of said bent peripheral portions of a first disk to form a belt-receiving groove,
 (f) a tubular member having a larger inner diameter than the diameters of said openings, said member including axially projecting lugs extending through said central portions, and
 (g) rings on opposite sides of said pulley, said rings being welded to the ends of said lugs.

2. A pulley construction comprising:
 (a) a pair of disk members secured together to define a peripheral belt-receiving groove, said disk members having central aligned shaft-receiving openings;
 (b) a tubular spacer member interposed between the disk members and surrounding said openings;
 (c) a pair of ring members having central openings aligned with the disk central openings, said rings each abutting an outer face of a different disc on a side of the abutted disk opposite said spacer member;
 (d) said disk members being fixed together; and,
 (e) portions of said disk members of one of said pairs defining bearing surfaces for locating said pulley on a shaft.

3. A fabricated pulley comprising:
 (a) a pair of sheet metal disks;
 (b) each of said disks including a rim having a bent peripheral portion, a central portion, and integrally formed spokes extending between said peripheral portion and said central portion, said spokes being inclined outwardly of said pulley from said rim;
 (c) said rims being secured together so that said bent peripheral portions co-operate to define a belt-receiving groove and so that said central portions are axially spaced apart;

(d) said central portions having aligned center openings sized to receive a shaft on which said pulley is mounted, and each central portion including a continuous, axially projecting flange around its center opening, said flanges co-operating to define axially-spaced bearings for said pulley on a shaft received through said openings;

(e) spacing means secured between said central portions;

(f) said spacing means comprising a tubular member having a larger inner diameter than the diameters of said openings;

(g) said tubular member including a hole through its side wall for receiving a set screw adapted to secure said pulley on a shaft and having circumferentially spaced, axially projecting lugs;

(h) said central portions being formed to receive said lugs; and, (i) said pulley further comprising a ring attached to the ends of said lugs on opposite sides of said pulley.

4. A fabricated pulley comprising:

(a) at least four sheet metal disks welded together near their peripheries;

(b) said disks having rim portions co-operating to define a plurality of belt-receiving grooves;

(c) spaced apart central portions having aligned center openings sized to receive a shaft on which said pulley is mounted, said central portions being formed with continuous axially projecting flanges around said openings, said flanges forming bearings for said pulley on a shaft extending through said openings;

(d) integrally formed spokes extending between said central portions and said rim portions of at least some of said disks;

(e) a tubular member secured between said central portions, said tubular member having a larger inner diameter than the diameters of said openings;

(f) said tubular member including circumferentially spaced, axially projecting lugs;

(g) said central portions having slots receiving said lugs; and, (h) said pulley further comprising a ring disposed adjacent the outside surface of each central portions, said rings being welded to the ends of said lugs.

References Cited

UNITED STATES PATENTS

| | | | |
|---|---|---|---|
| 620,478 | 2/1889 | Mittinger | 301—63 |
| 1,515,144 | 11/1924 | Charter | 301—63 |
| 1,944,779 | 1/1934 | Bowen | 74—230.8 |
| 2,200,245 | 5/1940 | Schultz | 74—230.8 |
| 2,473,335 | 6/1949 | Hardy | 74—230.8 X |
| 2,641,935 | 6/1953 | Wilken | 74—230.8 |
| 2,764,896 | 10/1956 | Arthur | 74—230.8 |

FOREIGN PATENTS

| | | |
|---|---|---|
| 454,827 | 3/1949 | Canada. |
| 1,747 | 1909 | Great Britain. |

FRED C. MATTERN, Jr., *Primary Examiner.*

DAVID J. WILLIAMOWSKY, *Examiner.*

J. A. WONG, *Assistant Examiner.*